Inventors
Brian L. King,
Ronald A. Herbert
by Sommers & Young
Attorneys

United States Patent Office 3,518,948
Patented July 7, 1970

3,518,948
RAILWAY TRUCKS WITH ELASTOMERIC
BIASED SIDE BEARINGS
Brian Leonard King, Allestree, and Ronald Arthur
Herbert, Littleover, England, assignors to British
Railways Board, London, England
Filed Apr. 20, 1967, Ser. No. 632,376
Claims priority, application Great Britain, Apr. 26, 1966,
18,267/66
Int. Cl. F16c *17/00;* B61f *5/08, 5/14*
U.S. Cl. 105—199                              2 Claims

ABSTRACT OF THE DISCLOSURE

A railway vehicle having a vehicle body mounted on a truck through a vertical pivot and through resilient pads which provide an elastic constraint to relative rotation of the vehicle body and truck about the pivot, the vehicle body being tied to the truck through a stiff elastic connection restraining the vehicle body from transverse movement relative to the truck. The stiff elastic connection is provided by one or more transverse radius rods having resilient bushings at their ends by which the one or more radius rods are mounted to the vehicle to provide the required elasticity. The ride characteristics of the vehicle are further improved by giving the truck wheels a tire profile which simulates a worn tire profile.

BACKGROUND OF THE INVENTION

The aim of the invention is to provide a railway vehicle having a truck construction and an arrangement for mounting the vehicle body on the truck such that truck hunting and body hunting are minimal. By the term "truck hunting" is meant unstable yawing and side translation of the truck in a cyclic fashion. By the term "body hunting" is meant unstable cyclic yawing and side translation of the body of the railway vehicle.

SUMMARY OF THE INVENTION

According to the present invention, there is provided a railway vehicle, wherein the vehicle body is connected to a truck through a vertical pivot and through a resilient connection which provides an elastic constraint to relative rotation of the vehicle body and the truck and wherein the vehicle body is tied to the truck through a stiff elastic connection such as a radius rod or rods.

Each radius rod is arranged so that it does not interfere with relative rotational movement of the vehicle body and the truck. Conveniently, this may be effected by making the resilient pivotal connection between the vehicle body and a single truck bolster and connecting the radius rod between the truck bolster and a truck side frame on which the truck bolster is resiliently mounted, for example, through a nest of springs. Where two independent side frames are used, a respective radius rod extends between the truck bolster and each side frame. Conveniently each radius rod is mounted at its ends to the side frame and bolster through rubber or like resilient bushings.

To avoid variation in the ride characteristics of the vehicle due to tire wear, the vehicle wheels have tires whose configuration simulates that of a worn tire rather than having the conventional coned configuration. The characteristics of the mounting arrangement are then chosen to give a good ride with this tire configuration.

To constrain the vehicle body against longitudinal movement relatively to the truck, at least one longitudinally extending radius rod is effectively mounted between the truck and the vehicle body, for example between the truck bolster and the truck side frame, the radius rod in its normal position being substantially horizontal. Thus the radius rod does not interfere to any significant extent with the sprung vertical movement between the vehicle body and the truck. Where independent side frames are provided, a respective longitudinally extending radius rod is connected between each side frame and the truck bolster.

DETAILED DESCRIPTION OF THE INVENTION

Figure 1:
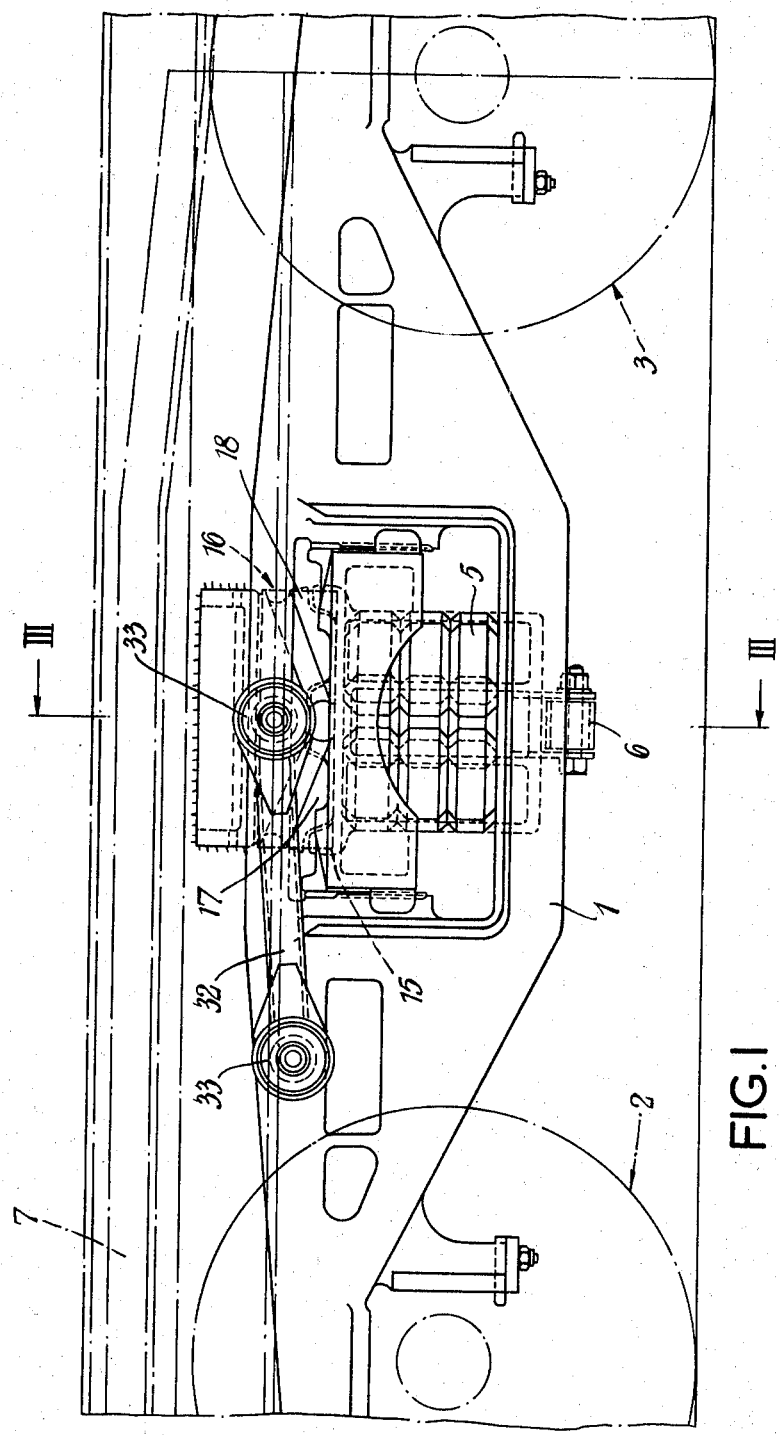
FIG. 1 is a side view of the truck with parts broken away, the vehicle body being shown fragmentarily in chain-dot line.
Figure 2:
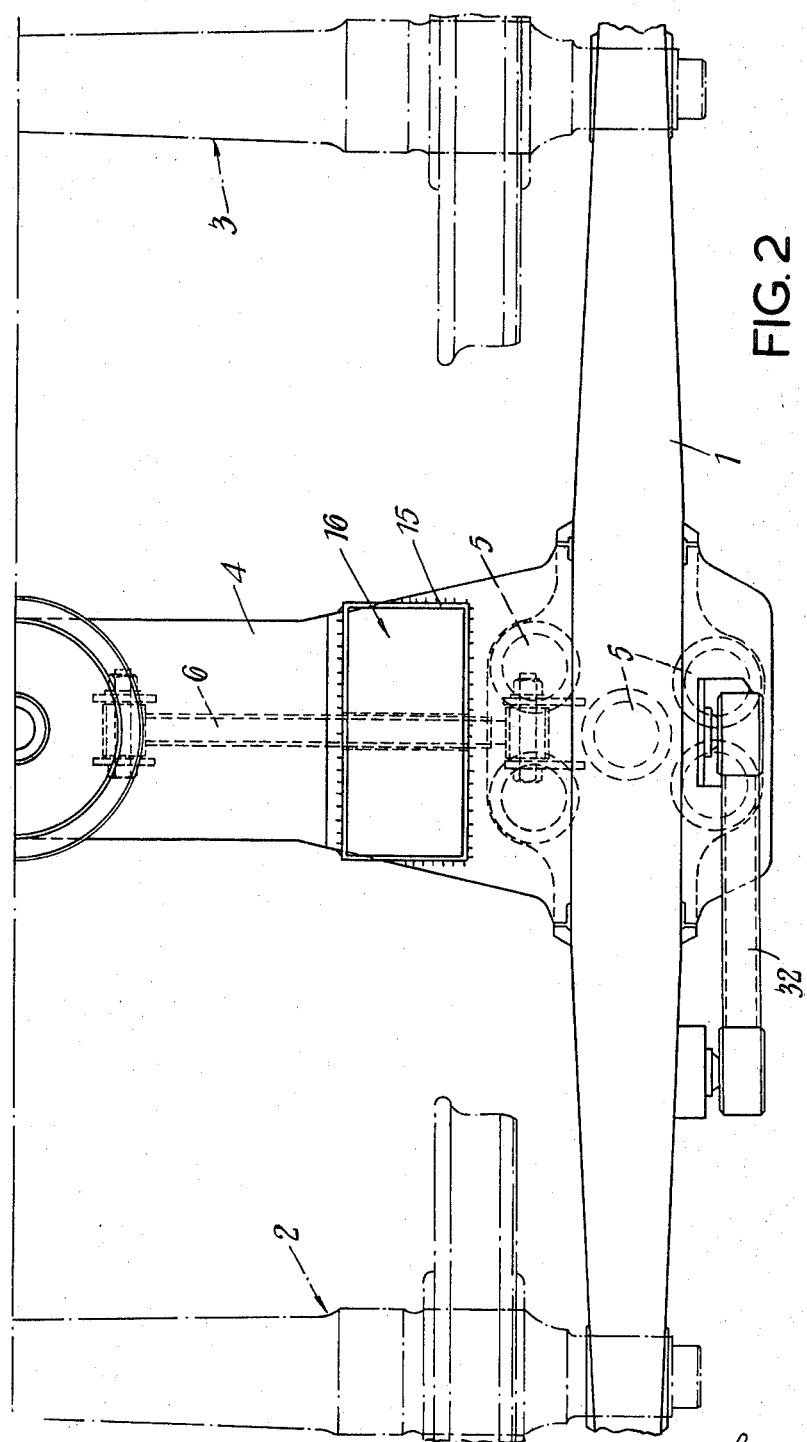
FIG. 2 is a half plan view of the truck, the other half plan view being the mirror image of that shown, the vehicle body being omitted.

Referring now to the drawings, the truck has side frames 1 which are independent of one another (i.e. are not tied to each other by cross-struts) and are provided with bearings for the axles of wheel-sets 2 and 3 adjacent their ends. A truck bolster 4 extends between the side frames 1 mid-way between the wheel-sets 2 and 3 and is supported at each end on the side frames 1 through a nest of springs 5 which may be rubber springs as shown in the drawings or coiled metal springs.

Figure 3:
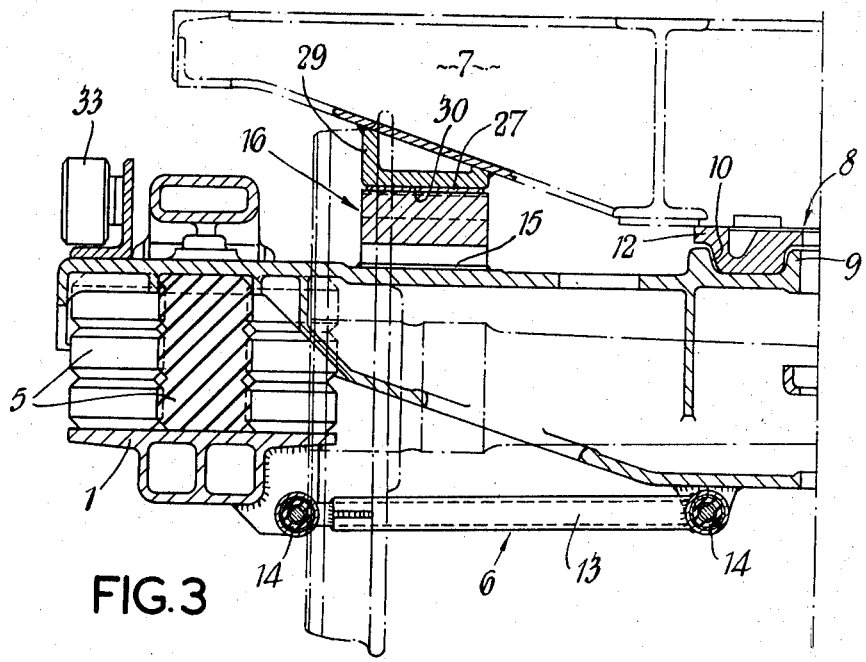
FIG. 3 is a half section on the line III—III of FIG. 1, looking in the direction of the arrows, the other half section being the mirror image of that shown.

Stiff elastic connections formed by radius rods 6 extending transversely of the truck tie the truck bolster 4 to the side frames 1 to restrain movement of the bolster 4 transversely of the truck relative to the side frames 1. The vehicle body 7 (FIGS. 1 and 3) is mounted to the bolster 4 mid-way along the bolster through pivot assembly 8 comprising central upstanding circular boss 9 surrounded by annular groove 10 on the bolster 4 and the complementary part 12 on the body 7, to permit the body 7 to rotate about a vertical axis relatively to the bolster 4. By reason of this pivot assembly 8 the body 7 and bolster 4 are locked together for transverse movement relatively to the side frames 1. Hence the radius rods 6 are effectively connected between the body 7 and side frames 1 and serve to restrain transverse movement of the body 7. The radius rods 6 each extend from a respective side frame to about the mid-length of the bolster 4 and each radius rod 6 comprises a metal rod 13 connected at its ends to the bolster 4 and side frame 1 respectively through rubber bushes 14 which provide the elasticity in the operation of the radius rods.

Figure 4:
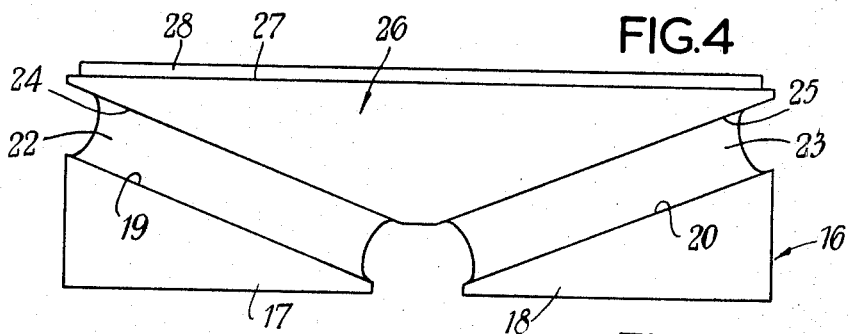
FIG. 4 shows an elevational view of a detail.

On either side of the pivot assembly 8 and equi-distant therefrom, the bolster 4 has platforms 15. Each platform 15 carries a side bearing 16 (shown to a larger scale in FIG. 4) for the vehicle body 7. Each side bearing 16 has a base comprising two wedge-shaped metal blocks 17 and 18 disposed with their sloping surfaces 19 and 20 running downwardly towards each other and in the longitudinal direction of the vehicle body 7. The blocks 17 and 18 are welded to the platform 15 and have bonded to their upwardly facing sloping surfaces 19 and 20 rubber blocks 22 and 23 respectively. The upper surfaces of the rubber blocks 22 and 23 are bonded to the sloping side faces 24 and 25 of an inverted prismatic-shaped member 26 forming a top bearing member, the side faces 24 and 25 each being parallel to the underlying sloping surface 19, 20. The member 24 has flat horizontal upper surface 27 to which a friction pad 28 of asbestos or the like is secured. The vehicle body bears on the friction pads 28 of the two side bearings 16 through members 29 (FIG. 3) presenting flat surfaces 30 to the friction pads 28. Thus the rubber blocks 22, 23 and friction pads 28 are in series in mounting the body 7 on the bolster 4.

To constrain the vehicle body 7 against longitudinal movement relatively to the truck, a radius rod 32 extends longitudinally of the truck at each side thereof and is secured at its ends to the adjacent side frame 1 and the bolster 4 through torsional rubber bushes 33. Longitudinal movement of the vehicle body 7 will be transmitted to the bolster 4 through the pivot assembly 8 and will be constrained by the radius rods 32 which are effectively connected between the body 7 and side frames 1. In their normal position the radius rods 32 are substantially horizontal so that they do not interfere to any significant extent with the sprung vertical movement between the vehicle body 7 and truck, effected by springs 5.

Figure 5:
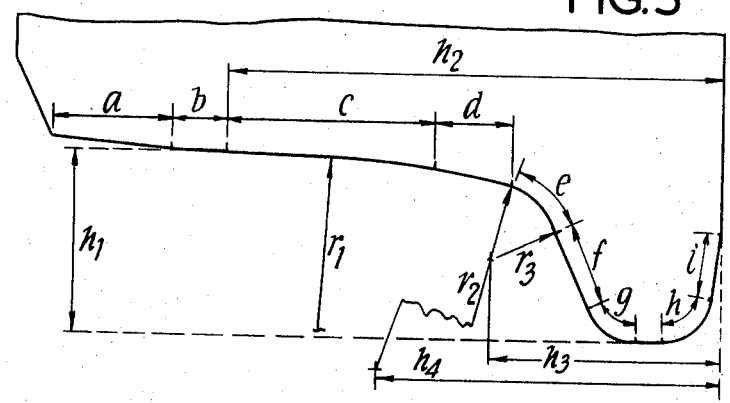
FIG. 5 illustrates the tire profile for the truck wheels.

To avoid variation in the ride characteristics of the vehicle due to tire wear, the vehicle wheels have tires (see particularly FIG. 5) whose profile simulates that of a worn tire rather than having a conventaional coned tire. The characteristics, i.e. spring strengths etc. of the bolster and vehicle body mounting arrangement are chosen to give a good ride with this tire configuration. The tire profile proceeding from the outer face to the inner face of the wheel comprises a band $a$ having about a 1 in 10 chamfer followed by a cylindrical band $b$ which is coaxial with the wheel axis followed by a concave band $c$ having a radius of curvature $r_1$ of about 13 inches followed by a concave band $d$ having a radius of curvature $r_2$ of about 4 inches. The tire then runs into the flange at $e$ with a radius of curvature $r_3$ of about 0.5 inch. The flange has on its inner surface a conical band $f$ leading to the flange periphery the conical surface extending at about 67° to the horizontal. The flange periphery is radiused at $g$ and $h$ with a radius of curvature of about 0.4 inch and the outer flange surface runs away from the periphery at $i$ at about 82° to the horizontal.

For a conventional sized wheel the width of the band $b$ would be 0.4 inch and the distances $h_1$, $h_2$, $h_3$ and $h_4$ would be 1.25 inches, 3.5 inches, 1.625 inches and 2.5 inches respectively.

In operation of a railway vehicle having a truck at each end thereof on which the vehicle is mounted as described above, each truck can yaw against the restoring force of the rubber blocks 22 and 23 of the side bearings 16 when the vehicle is in straight track. This restoring force is provided by shearing of the rubber blocks 22 and 23. This provides an elastic constraint characteristic for relative rotation of the truck and vehicle body, which is very advantageous in avoiding truck hunting. When the truck negotiates curves the friction pads 28 slide under the maximum longitudinal forces generated in the rubber pads.

Since the blocks 22 and 23 are inclined to the vertical in the longitudinal direction of the vehicle, this provides stiffening of the mounting longitudinally and softening of the mounting vertically compared with the case where the rubber blocks are horizontal.

We claim:
1. A railway vehicle comprising:
   (1) a railway truck having a spring-supported bolster extending transversely of the truck, and having platforms to receive side bearings,
   (2) side frames on which the bolster is supported at its ends through springs,
   (3) a connection between said bolster and each of said side frames restraining movement of said bolster transversely of said side frames,
   (4) an additional connection between said bolster and each side frame for restraining longitudinal movement of said bolster,
   (5) a vehicle body mounted on said bolster through a vertical pivot diposed at the mid-length of said bolster,
   (6) and side bearing assemblies mounted on said bolster symmetrically on either side of said pivot,
      (a) each side bearing assembly comprising two metal wedge-shaped solid blocks welded on a respective platform disposed with upwardly facing sloping surfaces inclined downwardly toward each other in the longitudinal direction of the vehicle,
      (b) a rubber block bonded to the sloping surface of each of said wedge-shaped blocks,
      (c) a solid top bearing member having inclined surfaces each bonded to the upper face of a respective one of said rubber blocks and extending substantially parallel to the underlying one of said upwardly facing sloping surfaces of said wedge-shaped members,
      (d) said top bearing member having a substantially horizontal upper surface,
      (e) a friction pad secured to said upper surface of said top bearing member for bearing a surface of said vehicle body to form a frictional coupling between the vehicle body and the bolster.

2. A railway vehicle as claimed in claim 1, wherein the truck has wheel-sets the tire profile of the wheels of which simulate a worn tire profile.

References Cited

UNITED STATES PATENTS

| | | | |
|---|---|---|---|
| 2,058,623 | 10/1936 | Protzeller et al. | 267—4 X |
| 2,740,360 | 4/1956 | Janeway | 105—200 |
| 2,917,007 | 12/1959 | Janeway | 105—200 |
| 3,045,998 | 7/1962 | Hirst | 105—199 X |
| 450,157 | 4/1891 | Hubbard | 105—199 |
| 637,498 | 11/1899 | Burger | 105—200 |
| 2,259,049 | 10/1941 | Swan et al. | 308—138 |
| 2,788,250 | 4/1957 | Blattner | 308—138 |
| 3,401,991 | 9/1968 | MacDonnell | 308—138 |

ARTHUR L. LA POINT, Primary Examiner

H. BELTRAN, Assistant Examiner

U.S. Cl. X.R.

105—197, 200; 267—3; 308—137, 138